(12) United States Patent
Basten

(10) Patent No.: US 8,576,115 B2
(45) Date of Patent: Nov. 5, 2013

(54) VEHICLE LENGTH SENSORS

(75) Inventor: Mark Basten, West Midlands (GB)

(73) Assignee: TRW Automotive US LLC, Livonia, MI (US)

( * ) Notice: Subject to any disclaimer, the term of this patent is extended or adjusted under 35 U.S.C. 154(b) by 249 days.

(21) Appl. No.: 13/059,738

(22) PCT Filed: Aug. 14, 2009

(86) PCT No.: PCT/IB2009/053601
§ 371 (c)(1),
(2), (4) Date: Apr. 19, 2011

(87) PCT Pub. No.: WO2010/020927
PCT Pub. Date: Feb. 25, 2010

(65) Prior Publication Data
US 2011/0181457 A1  Jul. 28, 2011

(30) Foreign Application Priority Data

Aug. 22, 2008  (GB) .................................. 0815406.4

(51) Int. Cl.
*G01S 13/00*  (2006.01)
*G01S 13/08*  (2006.01)
*B60Q 1/00*  (2006.01)
*G08G 1/16*  (2006.01)

(52) U.S. Cl.
USPC .............. 342/70; 342/118; 340/435; 340/903

(58) Field of Classification Search
USPC .............. 342/70–72, 104, 109, 118; 359/843, 359/871–877; 701/301; 340/435, 903, 904
See application file for complete search history.

(56) References Cited

U.S. PATENT DOCUMENTS

| 4,208,658 | A | * | 6/1980 | Fujiki et al. ..................... 342/70 |
| 4,308,536 | A | * | 12/1981 | Sims et al. ..................... 342/70 |
| 4,349,823 | A | * | 9/1982 | Tagami et al. .................. 342/70 |
| 4,626,850 | A | * | 12/1986 | Chey ............................. 340/903 |
| 4,679,158 | A | * | 7/1987 | Tate ............................... 700/302 |
| 5,132,851 | A | * | 7/1992 | Bomar et al. ................. 359/843 |
| 5,306,953 | A | * | 4/1994 | Weiner ......................... 307/10.1 |
| 5,309,137 | A | * | 5/1994 | Kajiwara ...................... 340/436 |
| 5,339,075 | A | * | 8/1994 | Abst et al. ..................... 340/903 |

(Continued)

FOREIGN PATENT DOCUMENTS

| BE | 1013342 A3 | 12/2001 |
| DE | 19543457 C1 | 10/1996 |

(Continued)

*Primary Examiner* — Jack W Keith
*Assistant Examiner* — Peter Bythrow
(74) *Attorney, Agent, or Firm* — MacMillan, Sobanski & Todd, LLC

(57) ABSTRACT

A vehicle length sensor for a vehicle such as a variable length truck, the sensor being provided with a mount for mounting the sensor on a vehicle and being arranged with a detection circuit arranged to measure, in use, a length of a vehicle to which the sensor is mounted. Typically, the detection circuit comprises a transmitter circuit, which is arranged to transmit radiation along the length of the vehicle, and a receiver circuit that is arranged to receive radiation that was transmitted by the transmitter circuit and reflected from the vehicle, and in which the detection circuit is arranged to determine from the reflected radiation the length of the vehicle. The sensor may also act as a lane change assistant, comparing the range of other vehicles to the length of the vehicle to which it is mounted.

11 Claims, 2 Drawing Sheets

(56) References Cited

U.S. PATENT DOCUMENTS

| | | | |
|---|---|---|---|
| 5,388,048 A * | 2/1995 | Yavnayi et al. | 701/301 |
| 5,521,579 A * | 5/1996 | Bernhard | 340/438 |
| 5,541,778 A * | 7/1996 | DeFlorio | 359/843 |
| 5,627,688 A * | 5/1997 | Valentino | 359/843 |
| 5,684,647 A * | 11/1997 | Rouleau | 359/843 |
| 5,714,927 A * | 2/1998 | Henderson et al. | 340/435 |
| 5,719,713 A * | 2/1998 | Brown | 359/843 |
| 5,734,336 A * | 3/1998 | Smithline | 340/903 |
| 5,754,123 A * | 5/1998 | Nashif et al. | 340/903 |
| 5,914,824 A * | 6/1999 | Valentino | 359/843 |
| 5,953,168 A * | 9/1999 | Valentino | 359/843 |
| 6,151,175 A * | 11/2000 | Osha | 359/843 |
| 6,193,380 B1 * | 2/2001 | Jacobs | 359/843 |
| 6,217,177 B1 * | 4/2001 | Rost | 359/843 |
| 6,264,337 B1 * | 7/2001 | Rannells et al. | 359/843 |
| 6,302,547 B1 * | 10/2001 | Valentino | 359/843 |
| 6,390,631 B1 * | 5/2002 | Lang et al. | 359/843 |
| 6,446,998 B1 * | 9/2002 | Koenig et al. | 280/432 |
| 6,594,614 B2 * | 7/2003 | Studt et al. | 702/150 |
| 6,657,581 B1 * | 12/2003 | Lippert et al. | 342/70 |
| 6,728,617 B2 * | 4/2004 | Rao et al. | 701/45 |
| 6,734,807 B2 * | 5/2004 | King | 340/903 |
| 6,753,766 B2 * | 6/2004 | Patchell | 340/436 |
| 6,753,805 B2 * | 6/2004 | Nakanishi et al. | 342/128 |
| 6,982,635 B2 * | 1/2006 | Obradovich | 340/439 |
| 7,363,140 B2 * | 4/2008 | Ewerhart et al. | 701/96 |
| 7,501,938 B2 * | 3/2009 | Widmann et al. | 340/435 |
| 7,626,533 B2 * | 12/2009 | Cong et al. | 342/70 |
| 7,639,841 B2 * | 12/2009 | Zhu et al. | 382/104 |
| 7,786,849 B2 * | 8/2010 | Buckley | 340/431 |
| 7,893,819 B2 * | 2/2011 | Pfeiffer et al. | 340/435 |
| 7,986,261 B2 * | 7/2011 | Harada | 342/107 |
| 2001/0024333 A1 * | 9/2001 | Rost | 359/843 |
| 2002/0107637 A1 * | 8/2002 | Okamura et al. | 701/301 |
| 2004/0017288 A1 * | 1/2004 | Rao et al. | 340/435 |
| 2004/0140927 A1 * | 7/2004 | Meinecke et al. | 342/70 |
| 2004/0239490 A1 * | 12/2004 | Chiba et al. | 340/435 |
| 2005/0024258 A1 * | 2/2005 | Matsuoka et al. | 342/70 |
| 2005/0068197 A1 * | 3/2005 | Regan | 340/932.2 |
| 2005/0093735 A1 * | 5/2005 | Samukawa et al. | 342/70 |
| 2005/0285758 A1 * | 12/2005 | Matsukawa et al. | 340/932.2 |
| 2006/0167633 A1 * | 7/2006 | Satonaka et al. | 701/300 |
| 2006/0261936 A1 * | 11/2006 | Widmann et al. | 340/435 |
| 2007/0182528 A1 * | 8/2007 | Breed et al. | 340/435 |
| 2007/0285808 A1 * | 12/2007 | Beale | 359/843 |
| 2008/0024283 A1 * | 1/2008 | Kim | 340/431 |
| 2008/0086269 A1 * | 4/2008 | Joe et al. | 701/301 |
| 2008/0186204 A1 * | 8/2008 | Buckley | 340/901 |
| 2008/0278365 A1 * | 11/2008 | Klein et al. | 342/104 |
| 2009/0040095 A1 * | 2/2009 | Ogawa | 342/70 |
| 2010/0039720 A1 * | 2/2010 | Lee et al. | 359/843 |
| 2010/0039721 A1 * | 2/2010 | Lee et al. | 359/843 |
| 2010/0039722 A1 * | 2/2010 | Lee et al. | 359/843 |
| 2010/0085652 A1 * | 4/2010 | Crouse | 359/843 |

FOREIGN PATENT DOCUMENTS

| | | |
|---|---|---|
| DE | 102006062559 A1 | 7/2008 |
| EP | 1726481 A1 | 11/2006 |
| JP | 2005236599 A | 9/2005 |
| KR | 20000057863 A | 9/2000 |

* cited by examiner

VEHICLE LENGTH SENSORS

CROSS-REFERENCE TO RELATED APPLICATIONS

This application is a national stage of International Application No. PCT/IB2009/053601 filed Aug. 14, 2009, the disclosures of which are incorporated herein by reference in entirety, and which claimed priority to Great Britain Patent Application No. 0815406.4 filed Aug. 22, 2008, the disclosures of which are incorporated herein by reference in entirety.

BACKGROUND OF THE INVENTION

This invention relates to vehicle length sensors, typically but not exclusively for vehicles such as may have variable length, and to a vehicle being provided with such a sensor.

The correct and quick determination by a driver of a vehicle of whether there is another vehicle alongside their vehicle is both essential for modern highway driving and is also potentially hazardous, particularly in situations where the driven vehicle has to change lanes, such as in an overtaking manoeuvre or when joining a highway. A vehicle may be in the blind spot—the area alongside the vehicle that cannot be viewed from the rear view mirrors of a vehicle. Even with a vehicle in the area visible in the rear view mirrors, a driver may be unable, be it through lack of skill, poor visibility or even through simply not having looked, to determine how close a vehicle is in an adjacent lane. This is particularly a problem with variable length vehicles, such as trucks, which can pull trailers of different lengths or numbers.

Blind spot detectors have been proposed which detect whether there is a vehicle immediately in the blind spot of the vehicle. However, they do not help a driver judge whether there is sufficient space to move into a given lane. Lane change assist detectors have also been proposed, which determine whether there is a fast-approaching vehicle in an adjacent lane; such detectors are more concerned with alerting a driver to a potential, rather than a present problem.

BRIEF SUMMARY OF THE INVENTION

According to a first aspect of the invention, there is provided a vehicle length sensor for a vehicle, the sensor being provided with a mount for mounting the sensor on a vehicle and being arranged with a detection circuit arranged to measure, in use, a length of a vehicle to which the sensor is mounted.

The inventor has appreciated that it is useful for the driver of a vehicle to know how long the vehicle is. This is particularly applicable where the vehicle is of variable length, such as vehicles that comprise one or more interchangeable trailers. Typically, the length would be the length of the entire vehicle including any trailer, or at least the length from where the sensor is mounted to the rear (or front) end of the vehicle.

The detection circuit may comprise a transmitter circuit, which is arranged to transmit radiation along the length of the vehicle, and a receiver circuit that is arranged to receive radiation that was transmitted by the transmitter circuit and reflected from the vehicle, and in which the detection circuit is arranged to determine from the reflected radiation the length of the vehicle. Such echo-detection systems can be conveniently adapted to work with the present invention; typically the radiation may comprise radio frequency electromagnetic radiation (with the detection circuit therefore defining a radar apparatus) or light (LIDAR).

The detection circuit may be arranged to determine the speed at which a target reflecting the transmitted radiation back to the receiver circuit is moving. Where an echo-detection system is involved, this could be, for example, by measuring a Doppler shift in the received radiation. The sensor may comprise an input for a vehicle speed signal indicative of the vehicle speed, and may comprise a vehicle speed sensor attached to that input; in such a case, the detection circuit may be arranged to determine that only echoes from targets that are moving at the same speed as the vehicle are echoes from the vehicle. This provides a method of discriminating between the vehicle and other vehicles.

Alternatively, the detection circuit may be arranged to detect the reflection of a reflective target having predetermined reflective qualities; in effect the detection circuit will search for an echo that corresponds to the reflective target.

The sensor may be arranged to periodically update its measurement of the vehicle's length. This can enable the length to be continually updated without any exertion by the driver of the vehicle. In such a case, the sensor may be provided with an input for an indication of whether the vehicle is turning, such as a steering angle or yaw rate indication, or an indication of the angle between a pulling unit of the vehicle and a trailer, with the sensor arranged to perform the measurement of the length at a higher rate when the vehicle is turning than when it is not. This is useful, because it is likely that a sensor mounted on the side of a vehicle will have better visibility of a trailer of the vehicle when the vehicle is turning (and hence the trailer is likely to be at an angle to a pulling unit of the vehicle) than when it is not.

The sensor may be arranged to detect any other vehicles which are, in use of the sensor, alongside the vehicle to which the sensor is mounted. Thus, the present invention can extend the functionality of prior art "blind spot" sensors. The sensor may be arranged, typically by use of the transmitter, receiver and detection circuits, to determine the distance of other vehicles alongside the vehicle from the vehicle in a direction parallel to the direction of travel of the vehicle. The sensor may be arranged to provide an indication to a driver of the vehicle, in use, of whether there are any vehicles alongside the vehicle for a distance of the length of the vehicle, typically plus a safety margin, and typically in the direction defined above. This means that the driver can use the indication to gauge whether it would be safe to pull into a lane based on the presence or absence of other vehicles alongside the vehicle.

Typically, the mount would be arranged such that the sensor could be, at least partially, mounted on the side of a vehicle, and most preferably at least partially mounted in or on an external rear view mirror housing of the vehicle. In such a case, the transmitter and receiver circuits may be arranged so as to transmit and receive the relevant radiation along the side of the vehicle, towards the vehicle's rear.

According to a second aspect of the invention, there is provided a vehicle provided with the sensor of the first aspect of the invention mounted thereon. Typically, the sensor would be mounted at least partially in or on a rear view mirror housing on the vehicle.

The vehicle may be provided with at least two sensors according to the first aspect of the invention; a sensor may be provided at least partially in or rear view mirror housings on opposing sides of the vehicle. This can have the advantages that the length of the vehicle can be easily checked when the vehicle corners in either transverse direction, and also, should the sensor be arranged to detect the presence of other vehicles alongside the vehicle, be able to detect their presence for lane changes in either direction.

Other advantages of this invention will become apparent to those skilled in the art from the following detailed description of the preferred embodiments, when read in light of the accompanying drawings.

DETAILED DESCRIPTION OF THE INVENTION

Figure 1:
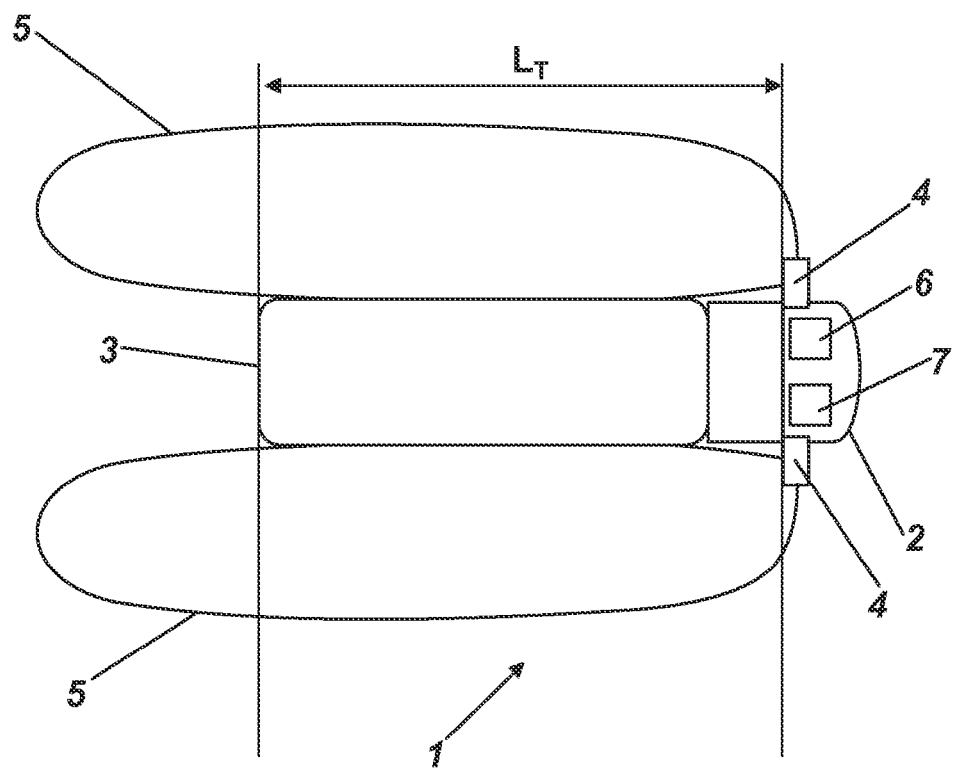
FIG. 1 shows a plan view of a vehicle fitting with vehicle length sensors according to an embodiment of the invention.

A vehicle 1, being a truck comprising a pulling, or tractor unit 2 and a trailer 3, is shown in FIG. 1 of the accompanying drawings. The truck 1, as is common, has exterior rear view mirrors 4 on either lateral side, to enable a driver of the truck 1 to see behind the truck when the truck is driven.

Figure 2:
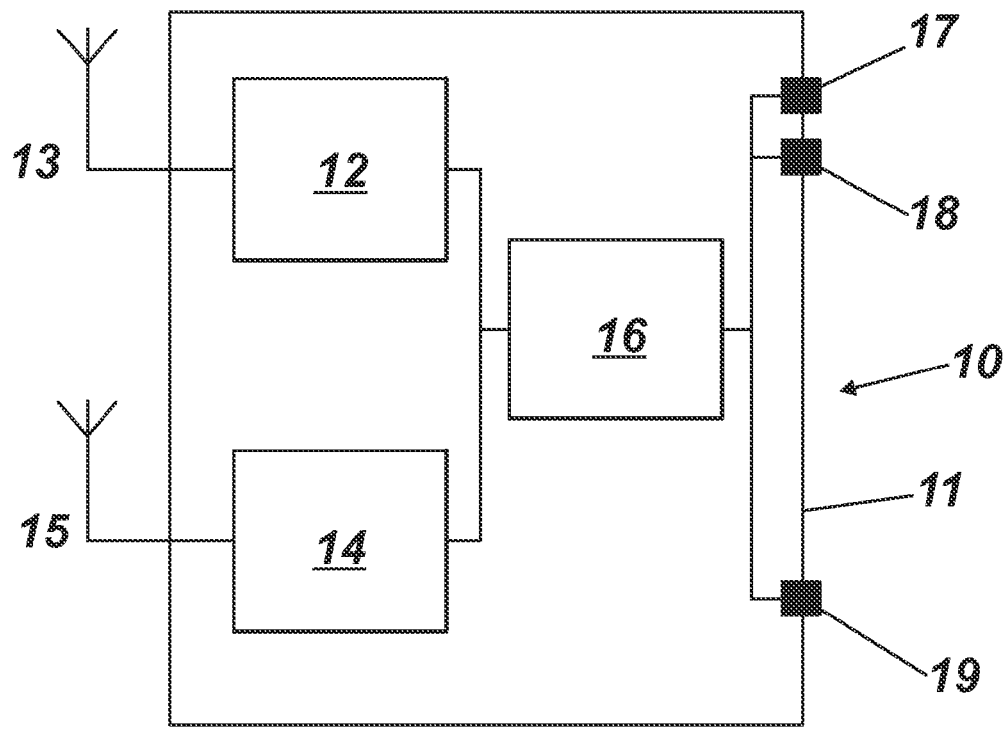
FIG. 2 shows a schematic view of a vehicle length sensor of FIG. 1.

In each of these rear view mirrors is a vehicle length sensor 10 as shown in FIG. 2 of the accompanying drawings. This sensor is able to determine the length of the truck 1. As such, it comprises a housing 11, which acts as mount for the sensor 10, so that the sensor can be mounted in the housing of the rear view mirror 4.

The sensor also comprises a transmitter circuit 12 having a transmit antenna 13 and a receiver circuit 14 having a receive antenna 15. The transmit antenna transmits a beam 5, shown in FIG. 1 of the accompanying drawings, of radio frequency electromagnetic energy in the direction generally behind the rear view mirror 4. This beam 5 illuminates both the side of the truck 1 and the road alongside the truck 1.

The receiver circuit 14 is arranged to receive echoes of the transmitted radiation that are reflected back by the side of the truck 1, the road and other vehicles to the receive antenna 15. As such, the transmitter and receiver circuits 12, 14 form a pair of circuits forming a radar system. In alternative embodiments, the beam 5 can comprise light radiation, thus forming LIDAR systems.

The transmitter and receiver circuits 12, 14 are connected to a detection circuit 16 of the sensor 10. This compares the transmitted and received signals to determine the range (from time of flight, or by using time or frequency domain reflectometry) and the speed (by analysing the Doppler shift of the echo) of the target from which the echoes were transmitted.

The sensor is also provided with a speed input 17 which takes a signal indicative of the truck's speed from a speed sensor 6 mounted on the truck 1. This can conveniently be an output from the truck's speedometer. The detection circuit compares the determined speed of the detected targets with the speed of the truck 1. For determining the length of the truck, the detection circuit 16 disregards any echoes that do not correspond to a target moving at the same speed as the truck. Typically, these would have zero relative speed relative to the sensor. The detection circuit can then take the echo with the highest range, and determine the length of the vehicle as that highest range, as that echo will correspond to the furthest point on the vehicle from the sensor.

The length thus determined is shown as $L_T$ in FIG. 1 of the accompanying drawings. This is the length from the sensor 10 (mounted in the rear view mirror 4) to the rear of the truck 1. If the total length of the truck 1 is desired, the fixed distance from the mirror 4 to the front of the truck can be added.

The detection circuit periodically updates this measurement of the truck length $L_T$. However, it has been appreciated that, when an articulated vehicle such as the present truck 1 is turning into a corner, then the rear of the vehicle will be at a less shallow angle to the sensor 10 on the inside of the turn. Accordingly, the sensor is provided with a turn angle input 18, which is connected to a turn angle sensor 7 of the truck 1. This sensor gives an output indicative of whether the truck 1 is turning; for example, the turn angle sensor 7 could be a steering angle sensor. The detection circuit can use this signal to increase the rate at which it measures the vehicle's length when the sensor is on the inside of a turn.

Particularly for trucks which have a "tapered" shape where no automatic detection of the length $L_T$ is possible, it shall be possible to carry out a manual measurement of this length so that the "overtaking aid" function can still operate. In order to achieve this, a suitable reflective device may be attached at the rear of the vehicle such as to return a beam transmitted by the sensor. This can have known reflection characteristics, such that the detection circuit can listen for a characteristic echo.

The detection circuit 16 can provide, at an output 19 of the sensor, a signal indicative of the length of the truck 1. This can be displayed in the cab of the truck 1, for the driver to see.

The sensor of this embodiment can also act as a lane change assistant device. In addition to detecting the length of the vehicle, the detection circuit will also detect echoes relating to other vehicles. As discussed above, it can determine the range of those vehicles from the echoes. This can be used to determine when there is sufficient space for the truck to move into an adjacent lane as discussed below with reference to FIGS. 3 and 4 of the accompanying drawings.

Figure 3:
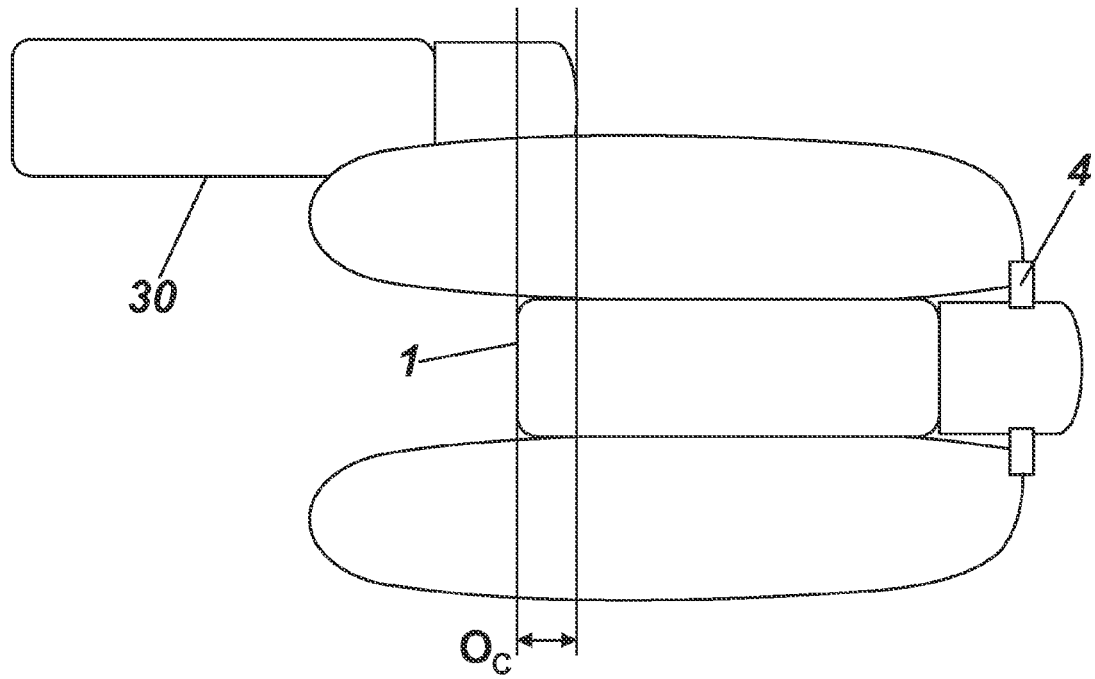
FIG. 3 shows a plan view of the vehicle of FIG. 1 attempting to overtake another vehicle.

In FIG. 3 of the accompanying drawings, the truck 1 is passing a further truck 30; both trucks are proceeding to the right of the Figures at highway speed. The sensor has already determined the length $L_T$ of the truck 1 as shown in FIG. 1 of the accompanying drawings. The detection circuit 16 then notes a further echo relating to the further truck 30, and calculates the range to the further truck 30. The detection circuit then subtracts the range to the further truck 30 from the length $L_T$.

If this difference is greater than an acceptable safety margin, the detection circuit can determine that there is sufficient space for the truck 1 to safely move into the desired lane. If not, then it determines there is not sufficient space. This determination is provided by the detection circuit 16 to the output 19. The determination can be displayed to the driver of the truck 1 in the cab (typically on the dashboard), typically as a red (unsafe) or green (safe) light. Given that there are sensors in each mirror 4, there will be such an indication for each side, corresponding to movements to the left and to the right.

In the case of FIG. 3 of the accompanying drawings, the further truck 30 is partially alongside the truck 1. As such, the range to the truck (in the direction of travel of the truck 1) is less than the length $L_T$. This means that the difference $O_C$ is negative, and is hence less than the safety margin. The driver of the truck 1 would see an "unsafe" red indication for the left hand side of the truck 1 in the cab.

Figure 4:
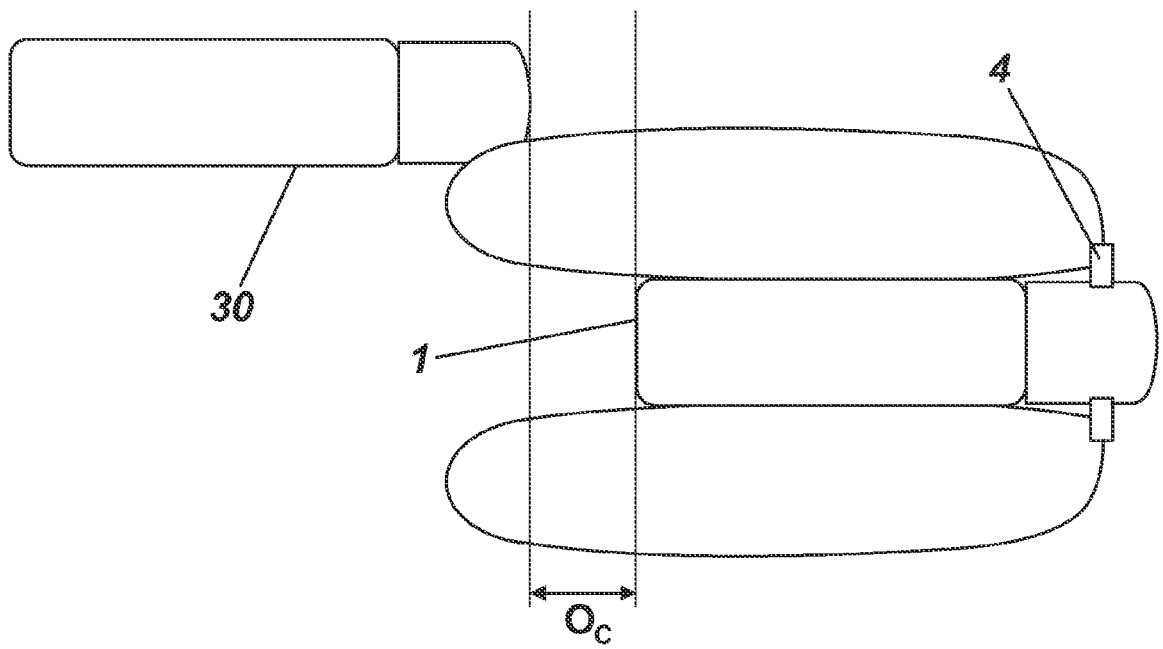
FIG. 4 shows a plan view of the vehicles of FIG. 3, in which the overtaking manoeuvre is being successfully completed.

In the case of FIG. 4 of the accompanying drawings, the truck 1 has drawn past the further truck 30. The detection circuit 16 in the sensor 10 on the left hand mirror 4 will detect the lane, which this time will be greater than the length $L_T$. In this case, the difference $O_C$ is greater than the safety margin, and so a green, safe, indication is given to the driver for a move to the left. The driver may therefore move left one lane.

Whilst the present embodiment has been described with reference to a truck 1, it could equally well be applied to any other vehicle where the measurement of length could be useful. Examples include a car which occasionally tows a caravan or trailer; in such a case the invention would be particularly useful, as such drivers tend to tow relatively infrequently and so will be less experienced at judging the gaps available for them to pull into. The system could also be used for any other vehicle that tows a variable length load; it could even be used for trains, where a variable number of carriages are provided, to help a driver stop a train at the correct position to align the carriages with a platform, or to prevent a driver entering a platform that is too short for the train.

Furthermore, whereas all of the circuitry of the sensor has been described as being mounted within the rear view mirror, there is no reason why the different parts could not be separately located. For example, the transmitter and receiver circuits and the corresponding antennas could be mounted as described in the mirrors, but the detection circuit and the outputs could be embodied in a circuit within the truck, perhaps even in the engine control unit.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A vehicle length sensor for a vehicle having a length, the sensor comprising a mount for mounting the sensor on the vehicle and a detection circuit arranged to measure, in use, the length of the vehicle to which the sensor is mounted, wherein the length is the length of the entire vehicle, including any trailer, or at least the length from where the sensor is mounted on the vehicle, including any trailer, to a rear end or a front end thereof, wherein the sensor is arranged to detect any other vehicles which are, in use of the sensor, alongside the vehicle to which the sensor is mounted, wherein the sensor is arranged to determine the distance of the other vehicles alongside the vehicle from the vehicle in a direction parallel to a direction of travel of the vehicle, and wherein the sensor is arranged to provide an indication to a driver of the vehicle, in use, of whether there are any vehicles alongside the vehicle for a distance of the length of the vehicle, plus an optional safety margin.

2. The sensor of claim 1, wherein the detection circuit comprises a transmitter circuit, which is arranged to transmit radiation along the length of the vehicle, and a receiver circuit that is arranged to receive reflected radiation that was transmitted by the transmitter circuit and reflected from the vehicle, and in which the detection circuit is arranged to determine from the reflected radiation the length of the vehicle.

3. The sensor of claim 2, wherein the detection circuit is arranged to determine a speed at which a target reflecting the transmitted radiation back to the receiver circuit is moving.

4. The sensor of claim 3, wherein the sensor comprises an input for a vehicle speed signal indicative of a speed of the vehicle; the detection circuit being arranged to determine that only reflections from targets that are moving at the same speed as the vehicle are echoes from the vehicle.

5. The sensor of claim 1, wherein the detection circuit is arranged to detect the reflection of a reflective target having predetermined reflective qualities.

6. The sensor of claim 1, arranged to periodically update the measurement of the vehicle's length, in which the sensor is provided with an input for an indication of whether the vehicle is turning, with the sensor being arranged to perform the measurement of the length at a higher rate when the vehicle is turning than when it is not.

7. The sensor of claim 1, wherein the mount is arranged such that the sensor could be, at least partially, mounted on the side of a vehicle.

8. The sensor of claim 7, wherein the mount is arranged so as to be at least partially mounted in or on an external rear view mirror housing of the vehicle.

9. A vehicle provided with a vehicle length sensor, the vehicle having a length, the sensor comprising a mount mounting the sensor on the vehicle and a detection circuit arranged to measure, in use, the length of the vehicle, wherein the length is the length of the entire vehicle, including any trailer, or at least the length from where the sensor is mounted on the vehicle, including any trailer, to a rear end or a front end thereof, wherein the sensor is arranged to detect any other vehicles which are, in use of the sensor, alongside the vehicle to which the sensor is mounted, wherein the sensor is arranged to determine the distance of the other vehicles alongside the vehicle from the vehicle in a direction parallel to a direction of travel of the vehicle, and wherein the sensor is arranged to provide an indication to a driver of the vehicle, in use, of whether there are any vehicles alongside the vehicle for a distance of the length of the vehicle, plus an optional safety margin.

10. The vehicle of claim 9, wherein the sensor is mounted at least partially in or on a rear view mirror housing of the vehicle.

11. The vehicle of claim 9, wherein the vehicle is provided with at least one further sensor comprising a mount mounting the further sensor on the vehicle and a detection circuit arranged to measure, in use, the length of the vehicle, provided on an opposing side of the vehicle to the sensor.

* * * * *